United States Patent [19]

Ricordi

[11] Patent Number: 4,850,323

[45] Date of Patent: Jul. 25, 1989

[54] SYSTEM FOR MEASURING THE ANGULAR POSITION OF AN INTERNAL COMBUSTION ENGINE CRANKSHAFT

[75] Inventor: Eppo Ricordi, Collegno, Italy

[73] Assignee: Fiat Auto S.p.A., Turin, Italy

[21] Appl. No.: 121,930

[22] Filed: Nov. 17, 1987

[30] Foreign Application Priority Data

Nov. 26, 1986 [IT] Italy ............................... 54126/86[U]

[51] Int. Cl.⁴ ............................................. F02P 5/145
[52] U.S. Cl. .................................... 123/414; 123/617; 324/208; 310/168
[58] Field of Search ............... 123/414, 476, 494, 617; 310/168, 170; 73/116, 117.3, 517 R, 518; 324/166, 173, 174, 207, 208

[56] References Cited

U.S. PATENT DOCUMENTS

| Re. 30,928 | 5/1982 | Fuzzell et al. | 123/414 X |
|---|---|---|---|
| 2,556,471 | 6/1951 | Elam | 310/170 X |
| 3,356,896 | 12/1967 | Shano | 123/414 X |
| 4,095,179 | 6/1978 | Bremen et al. | 324/207 |
| 4,222,263 | 9/1980 | Armstrong | 310/168 X |
| 4,235,101 | 11/1980 | Stadelmann | 73/116 |
| 4,455,865 | 6/1984 | Davenport et al. | 73/116 |
| 4,459,968 | 7/1984 | Brandt et al. | 123/617 X |
| 4,510,408 | 4/1985 | Jovick et al. | 310/168 |
| 4,677,378 | 6/1987 | Tokura et al. | 123/617 X |
| 4,787,355 | 11/1988 | Maeda | 123/414 |
| 4,795,278 | 1/1989 | Hayashi | 324/208 X |

FOREIGN PATENT DOCUMENTS

| 0004416 | 10/1979 | European Pat. Off. |
| 2043889 | 2/1971 | France . |
| 2283425 | 3/1976 | France . |

Primary Examiner—Willis R. Wolfe
Attorney, Agent, or Firm—Shlesinger & Myers

[57] ABSTRACT

A system is described for measuring the angular position of an internal combustion engine crankshaft, comprising a magnetic sensor and at least two projections provided on a flywheel which is rigid with the crankshaft. The main characteristic of the present invention is that the sensor has its longitudinal axis parallel to the axis of the crankshaft and is supported by that portion of the crankcase which faces the flywheel. As the projections pass in proximity to the sensor, this latter generates an electrical pulse which is utilized in a central control unit for electronic ignition and/or electronic injection.

6 Claims, 1 Drawing Sheet

SYSTEM FOR MEASURING THE ANGULAR POSITION OF AN INTERNAL COMBUSTION ENGINE CRANKSHAFT

BACKGROUND OF THE INVENTION

This invention relates to a system for measuring the angular position of the crankshaft of an internal combustion engine, particularly for controlling an electronic ignition device. Currently used systems are known to comprise a magnetic sensor mounted in proximity to the flywheel for sensing the presence of projections on the engine flywheel, so as to generate for each projection a corresponding electrical pulse which is utilised in a central control unit for electronic ignition and/or electronic injection. The main drawback of these systems is that the position of the sensor has necessarily to be accurately adjusted relative to the engine.

In this respect, it is well known that, if it is positioned on parts which are detached from the crankcase, large tolerances arise and, therefore, as the sensor can be installed either before or after the installation of the flywheel, it is apparent that the position of this sensor must then be modified on the basis of its position relative to the flywheel.

SUMMARY OF THE INVENTION

The object of the crankshaft of the present invention is to provide a system for measuring the angular position of an internal combustion engine which is free from the aforesaid drawback, by obviating any need for radial and axial adjustment subsequent to assembly.

The present invention provides a system for measuring the angular position of a crankshaft in an internal combustion engine, comprising at least two projections on a flywheel which are angularly rigid with the crankshaft, and a magnetic sensor arranged to sense the passage of the projections in order to generate an electrical pulse utilised, preferably, by a central control unit for electronic ignition and/or electronic injection. The magnetic sensor is supported by that portion of the engine crankcase which faces the flywheel, and has its longitudinal axis parallel to that of the crankshaft. The projections extend from that face of the flywheel which faces the portion of the crankcase.

BRIEF DESCRIPTION OF THE DRAWINGS

The present invention will be more apparent from the description of a preferred embodiment thereof given hereinafter by way of a non-limiting example with reference to the accompanying drawings, in which.

DETAILED DESCRIPTION OF THE INVENTION

Figure 1:
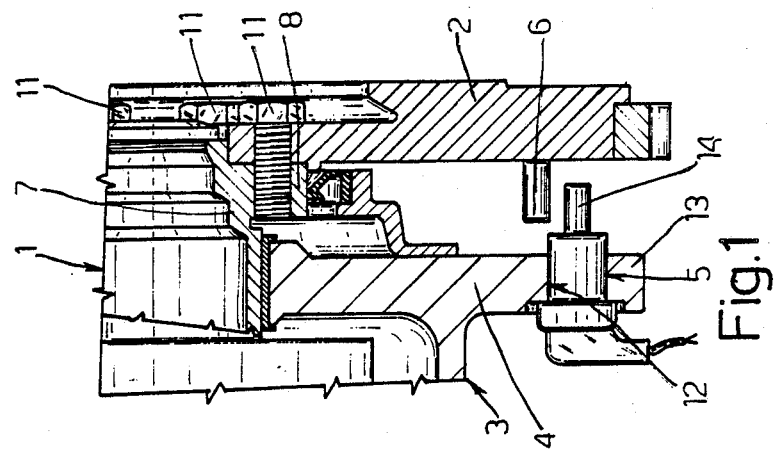
FIGS. 1 and 2 are sectional and frontal views respectively of a region of an internal combustion engine in which a system for measuring the angular position of a crankshaft is installed.
Figure 2:
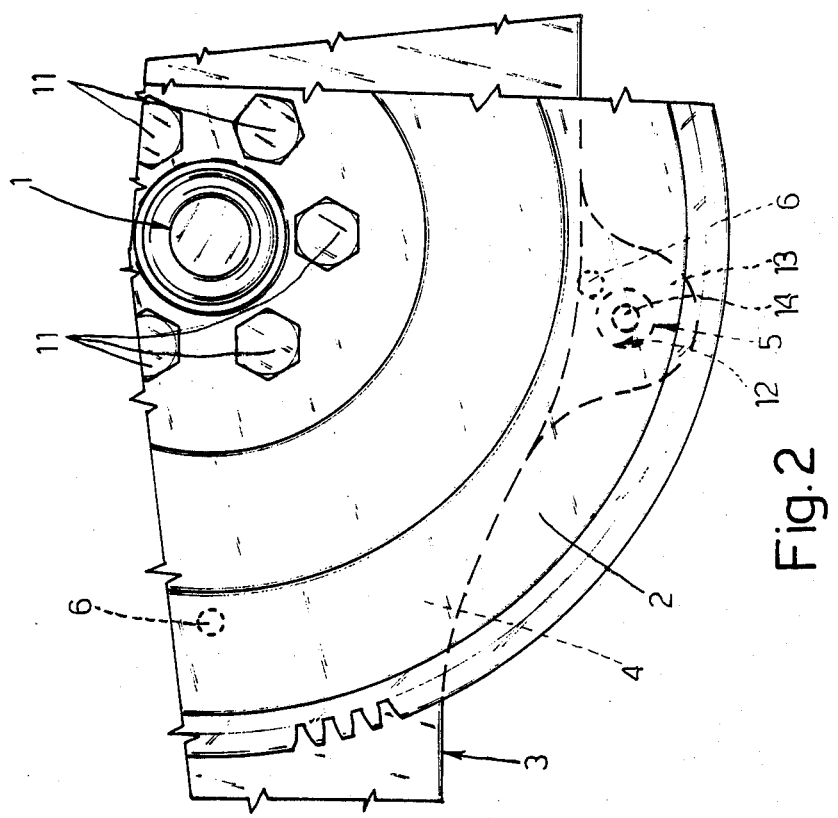

As shown in FIGS. 1 and 2, the measuring system according to the present invention is mounted on an internal combustion engine comprising a crankshaft 1, a flywheel 2 angularly rigid with the crankshaft 1, and a crankcase 3, a portion 4 of which is parallel to the flywheel 2. The system comprises a magnetic sensor 5, of known type easily available commercially, and two projections, defined by respective cylindrical pins 6, extending from the face of the flywheel 2 facing the portion 4 of the crankcase 3 and perpendicular to the flywheel. The flywheel is made rigid with the crankshaft by screws 11. The sensor 5 is substantially cylindrical and has its longitudinal axis parallel to that of the crankshaft 1. The sensor 5 is housed in a hole 12, acting as a seat with its axis parallel to the axis of the crankshaft 1 and provided in an appendix 13 extending from and coplanar with the portion 4 of the crankcase 3. The sensor 5 has its head 14 extending beyond the hole 12 toward the flywheel 2. As best shown in FIG. 2, the cylindrical projections or pins 6 are circumferentially located relative to the center of the flywheel 2. As each projection 6 passes in proximity to the sensor 5, this latter generates an electrical pulse which, when in use, is utilised in a central control unit for electronic ignition and/or electronic injection.

The advantages of the present invention are apparent from the aforegoing description.

In particular, the sensor 5 is installed on the engine which, as is well known, is of high precision construction, ie with minimum tolerances. Consequently, there is no need to either radially or axially adjust the position of the sensor 5 relative to the projections 6 of the flywheel 2. Moreover, it should be noted that the sensor 5 is installed in a region of limited space and, in spite of this, its installation is less complicated that that of current systems as there are not adjustment brackets. Finally, it should be noted that the engine requires no modification (except for the hole 12) for the installation of the sensor 5, and that all those sometimes complicated operations involved in the installation and fixing of the sensor support members on other parts of the power unit are dispensed with.

Finally, modifications can be made to the system heretofore described and illustrated, but without leaving the protective scope of the present invention.

I claim:

1. Measuring system for the angular position of a crankshaft, comprising:
   (a) an engine comprising an engine crankcase, a rotatable crankshaft housed in said crankcase and having a portion extending therebeyond, and a flywheel secured to said portion and rotatable therewith;
   (b) at least two projections extending from said flywheel toward said crankcase and being rotatable with said flywheel; and,
   (c) a magnetic sensor secured to said crankcase and extending beyond said crankcase toward said flywheel for sensing the passage thereby of the projections and for generating an electrical signal indicative thereof as said flywheel is rotated by said crankcase.

2. The system of claim 1, wherein:
   (a) said crankcase has an appendix extending radially therefrom;
   (b) an aperture is disposed in said appendix and has an axis parallel to the axis of said crankshaft; and,
   (c) said sensor is mounted in said aperture.

3. The system of claim 2, wherein:
   (a) said sensor includes a head, and said head is disposed exteriorly of said crankcase.

4. The system of claim 1, wherein:
   (a) said projections are disposed radially inwardly relative to said sensor.

5. The system of claim 2, wherein:
   (a) said appendix is disposed parallel to said flywheel.

6. The system of claim 3, wherein:
   (a) said projections terminate proximate said head.

* * * * *